US009007954B2

(12) United States Patent
Wijting et al.

(10) Patent No.: US 9,007,954 B2
(45) Date of Patent: Apr. 14, 2015

(54) BEACON TRANSMISSION FOR WIRELESS NETWORKS

(75) Inventors: Carl Simon Wijting, Helsinki (FI); Jarkko Kneckt, Espoo (FI)

(73) Assignee: Nokia Corporation, Espoo (FI)

( * ) Notice: Subject to any disclaimer, the term of this patent is extended or adjusted under 35 U.S.C. 154(b) by 1786 days.

(21) Appl. No.: 11/438,968

(22) Filed: May 23, 2006

(65) Prior Publication Data

US 2006/0268746 A1  Nov. 30, 2006

Related U.S. Application Data

(60) Provisional application No. 60/685,100, filed on May 26, 2005.

(51) Int. Cl.
*H04L 12/28* (2006.01)
*H04W 48/08* (2009.01)
*H04W 48/00* (2009.01)
(Continued)

(52) U.S. Cl.
CPC ............. *H04W 48/08* (2013.01); *H04W 8/26* (2013.01); *H04W 48/00* (2013.01); *H04W 48/16* (2013.01)

(58) Field of Classification Search
CPC .......... H04L 12/28; H04L 12/52; H04Q 7/24; H04Q 7/00; H04Q 7/20; H04B 7/212
USPC ......... 370/254, 400, 331, 345, 449, 328, 350; 455/456.1–456.5, 435.1, 450, 502, 560
See application file for complete search history.

(56) References Cited

U.S. PATENT DOCUMENTS 6,671,525 B2    12/2003  Allen et al.
6,674,760 B1    1/2004   Walrand et al.
(Continued)

FOREIGN PATENT DOCUMENTS

EP    1566922 A1    8/2005
EP    1 626 529 A1  2/2006
(Continued)

OTHER PUBLICATIONS

Godfrey, Tim "Inside 802.11e: Making QoS a Reality over WLAN Connections", http://www.commsdesign.com/showArticle.jhtml?articleID=17000388, (Dec. 19, 2003), 11 pgs.
(Continued)

*Primary Examiner* — Michael T Vu
(74) *Attorney, Agent, or Firm* — Alston & Bird LLP

(57) ABSTRACT

Various embodiments are disclosed relating to beacon transmissions in wireless networks. In an example embodiment, a wireless node may receive a beacon from one or more wireless nodes. The receiving node may generate and transmit a beacon map to other wireless nodes in the network. The beacon map may provide information relating to one or more of the received beacons, such as a time stamp or other time information for the beacon and the originating wireless node for the beacon, such as an address of the originating wireless node. In an example embodiment, the beacon map may be transmitted upon request or within a beacon, or within another message. In another example embodiment, a beacon map may be received at a receiving wireless node, including information relating to beacons from one or more other wireless nodes. A status of at least one of the beacons may be determined based upon the beacon map.

9 Claims, 6 Drawing Sheets

(51) Int. Cl.
*H04W 8/26* (2009.01)
*H04W 48/16* (2009.01)

(56) References Cited

U.S. PATENT DOCUMENTS

| | | | |
|---|---|---|---|
| 6,947,768 B2* | 9/2005 | Adachi et al. | 455/560 |
| 7,151,945 B2* | 12/2006 | Myles et al. | 455/502 |
| 7,388,886 B2 | 6/2008 | Perkins et al. | |
| 7,567,540 B2* | 7/2009 | Sakoda | 370/338 |
| 2004/0208152 A1 | 10/2004 | Perkins et al. | |
| 2004/0264425 A1 | 12/2004 | Nishikawa | |
| 2005/0047386 A1* | 3/2005 | Yi | 370/345 |
| 2005/0094558 A1 | 5/2005 | Lu | |
| 2005/0201330 A1* | 9/2005 | Park et al. | 370/331 |
| 2005/0226207 A1* | 10/2005 | Sharma | 370/350 |
| 2006/0098676 A1 | 5/2006 | Cai et al. | |
| 2006/0268716 A1 | 11/2006 | Wijting et al. | |
| 2006/0268746 A1 | 11/2006 | Wijting et al. | |
| 2006/0268906 A1 | 11/2006 | Kneckt | |
| 2008/0049703 A1 | 2/2008 | Kneckt et al. | |
| 2008/0057928 A1 | 3/2008 | Achter et al. | |

FOREIGN PATENT DOCUMENTS

| | | |
|---|---|---|
| WO | 2004/102887 A1 | 11/2004 |
| WO | 2005045689 A2 | 5/2005 |
| WO | 2007029973 A1 | 3/2007 |
| WO | 2007060545 A2 | 5/2007 |
| WO | 2007060545 A3 | 5/2007 |
| WO | 2007063427 A2 | 6/2007 |
| WO | 2007063427 A3 | 6/2007 |

OTHER PUBLICATIONS

"Part 11: Wireless LAN Medium Access Control (MAC) and Physical Layer (PHY) Specifications", IEEE Std 802.11-1999 (Reaff 2003), (2003), pp. 1-716.

Chung, Simon "Understanding the MAC impact of 802.11e: Part 2", CommsDesign, URL: http://www.commsdesign.com/showArticle.jhtml?articleID=16502136, (Oct. 30, 2003).

Geier, Jim "802.11 Beacons Revealed", Wi-Fi Planet Tutorials, www.wi-fiplanet.com/tutorials/article.php/1492071, (Oct. 31, 2002).

Calafate, Carlos T., et al., "Assessing the effectiveness of IEEE 802.11e in multi-hop mobile network environments", 8 pgs.

Brenner, Pablo "A Technical Tutorial on the IEEE 802.11 Standard", IEEE 802.11: The New Wireless LAN Standard, pp. 1-13.

"Part 11: Wireless LAN Medium Access Control (MAC) and Physical Layer (PHY) specifications: Amendment : Medium Access Control (MAC) Quality of Service (QoS) Enhancements", Institute of Electrical and Electronics Engineers, Inc. P802.11e/D13.0, (Jan. 2005), pp. 1-187.

Conner, W. S., et al., "Draft 802.11 TGs Extensible WLAN Mesh Networking Proposal", Intel Corp. & NTT DoCoMo, (May 15, 2005), pp. 1-72.

Yu, James "IEEE 802.11e QoS QoS for Wireless LAN: A Research Direction", TDC Network Seminar, (Dec. 9, 2003), pp. 1-26.

"Draft Amendment to Standard for Information Technology—Telecommunications and Information Exchange Between Systems—LAN/MAN Specific Requirements—Part 11: Wireless Medium Access Control (MAC) and physical layer (PHY) specifications Amendment 7: Radio", IEEE 1 P802.11k/D2.0, (Feb. 2005), pp. 1-124.

Jokela, Jari et al., "Broadcast and Multicast Enhancements", IEEE 802.11-06/1030r1, (Jul. 18, 2006), pp. 1-13.

Jokela, Jari et al., "IEEE P802.11 Wireless LANs: Broadcast and Multicast Enhancements", (Jul. 15, 2006), pp. 1-18.

Casetti, C. et al., "Improving fairness and throughput for voice traffic in 802.11E EDCA", in Personal, Indoor and Mobile Radio Communications,, PIMRC 2002, 15th IEEE International Symposium, V.1,(2004), pp. 525-530.

Lim, L. W., et al., "A QoS Scheduler for IEEE 80.11e WLANs", in Consumer Communications and Networking Conference, CCNC 2004, First IEEE,(2004), pp. 199-204.

Pong, D. et al., "Using Transmission Opportunities and Judicious Parameter Selection in Enhancing Real-time Applicantionsover 802.11 Wireless LANs", in Australian Telecommunications , Networks and Applications Conference, (2003), pp. 1-5.

International Search Report and Written Opinion for corresponding application # PCT/IB2006/003866, (Aug. 24, 2007), 15 Pgs.

"IPRP", Written Opinion of the International Searching Authority; ISA/SE, (Dec. 13, 2007), pp. 1-11.

"IEEE P802.11s Do.01; Draft Amendment to Standard for Information Technology Ã?? Telecommunications and Information Exchange Between Systems Ã?? LAN/MAN Specific Requirements Ã?? Part 11: Wireless Medium Access Control (MAC) and Physical Layer (PHY) Specifi", IEEE P802.11s/D0.01, Mar. 2006, 802.11 Working Group of the LAN/MAN Committee; 2006 Institute of Electrical and Electronics Engineers, Inc. NY, NY, (Mar. 2006), pp. 1-218.

"Draft Amendment to Standard for Information Technology—Telecommunications and Information Exchange Between Systems—LAN/MAN Specific Requirements", Part 11: Wireless Medium Access Control (MAC) and physical layer (PHY) specifications: Amendment: ESS Mesh Networking: IEEE P802.11s(D0.02, Jun. 2006, 802.11 Working Group of the LAN/MAN Committee; 2006 Institute of Electrical and Electronics Engineers,, (Jun. 2006), pp. 1-218.

Brenner, Pablo "A Technical Tutorial on the IEEE 802.11, Protocol", Breezecom Wireless Communications, 2007, Document is password protected. Substituted different version.,(1997), pp. 1-24.

"Part 11: Wireless LAN Medium Access Control (MAC) and Physical Layer (PHY) Specifications", ANSI/IEEE Std 802.11, 1999 Edition, (Jun. 12, 2003).

"Part 11: Wireless LAN Medium Access Control (MAC) and Physical Layer (PHY) Specifications: Amendment: Medium Access Control (MAC) Quality of Service (QoS) Enhancements", Institute of Electrical and Electronics Engineers, Inc. P802.11e/D13.0, (Jan. 2005).

Calafate, Carlos T., et al., "Assessing the effectiveness of IEEE 802.11e in multi-hop mobile network environments."

Chung, Simon, et al., "Understanding the MAC impact of 802.11e: Part 2", CommsDesign, www.commsdesign.com/showArticle.jhtml?articleID=16502136, (Oct. 30, 2004).

Conner, W. S., et al., "Draft 802.11 TGs Extensible WLAN Mesh Networking Proposal", Intel Corp. & NTT DoCoMo, (May 15, 2005).

Geier, Jim, "802.11 Beacons Revealed", Wi-Fi Planet Tutorials, http://www.wifiplanet.com/tutorials/article.php/1492071, (Oct. 31, 2002).

Godfre, Tim, "Inside 802.11e: Making QoS a Reality over WLAN Connections", CommsDesign, www.commsdesign.com/showArticle.jhtml?articleID=17000388, (Dec. 19, 2003).

International Search Report and Written Opinion for corresponding application # PCT/IB2006/003997, (Sep 21, 2007),15 Pgs.

International Preliminary Report on Patentability for corresponding application # PCT/IB2006/003997, (Dec. 13, 2007).

Office Action received for Chinese Patent Application No. 200680005525.8 (with English Translation), mailed on Jan. 29, 2010, 23 pages.

Notice of Reexamination for Chinese Patent Application No. 200680005525.8 (with English Translation), mailed on Sep. 5, 2011, 21 pages.

Decision on Reexamination for Chinese Application No. 2006800055258 dated May 30, 2012.

Extended European Search Report received European Patent Application No. 06842394.6, mailed on Nov. 28, 2011, 6 pages.

Final Office Action for U.S. Appl. No. 11/440,374, mailed on Jun. 23, 2010, 29 pages.

* cited by examiner

BEACON TRANSMISSION FOR WIRELESS NETWORKS

CROSS-REFERENCE TO RELATED APPLICATIONS

This application claims priority to U.S. Provisional application Ser. No. 60/685,100, filed on May 26, 2005, entitled "Beacon Transmission for Meshed Wireless Networks," hereby incorporated by reference.

BACKGROUND

The rapid diffusion of Wireless Local Area Network (WLAN) access and the increasing demand for WLAN coverage is driving the installation of a very large number of Access Points (AP). Though the cost of APs is traditionally not very high, the deployment of APs often involves connecting the AP through a wired connection (traditionally Ethernet), and this introduces complexity and high costs for deployment in certain locations.

The concept of a wireless meshed network of APs or other wireless nodes is being developed. The nodes within one meshed network may in some cases operate at the same frequency. This means that for such systems, in contrast to commonly deployed WLAN systems today, several APs in such meshed network may transmit their beacon messages in the same channel. This may result in the collision of beacon messages and can be very inefficient, since in the currently deployed WLAN standards (such as IEEE 802.11b) no contention resolution is provided for beacon messages. Rather, each AP may transmit its beacon message after an Inter-frame Space (IFS) since the previous data transmission has ended. In such case, a beacon collision from the two APs will very likely result.

SUMMARY

Various embodiments are disclosed relating to beacons and wireless networks, such as WLAN networks, wireless meshed networks or other wireless networks. In an example embodiment, a Beacon Map may be generated and transmitted.

According to another example embodiment, a wireless node or mesh point may receive a beacon from one or more other nodes or mesh points in the wireless network, and may generate a Beacon Map. The wireless node may transmit the generated Beacon Map to one or more other mesh points or nodes in the wireless network.

In an example embodiment, the Beacon Map may provide information relating to one or more of the received beacons. In an example embodiment, the Beacon Map may include a time stamp or other time information for the beacon, and the originating wireless node or mesh point for the beacon. For example, the Beacon Map may include an address, such as a MAC address, of the originating wireless node for the beacon. The Beacon Map may be transmitted, for example, in response to a request message, such as a probe request, in a beacon, or other message.

In another embodiment, a Beacon Map may be received at a receiving wireless node. The receiving wireless node may determine based on the Beacon Map that its beacon has collided with a beacon from another wireless node. The receiving wireless node may relocate the position of its beacon.

In another example embodiment, a Beacon Map may be received at a receiving wireless node. The Beacon Map may include information relating to beacons from one or more other wireless nodes. A status of at least one of the beacons may be determined based upon the Beacon Map. For example, the receiving wireless node may determine whether or not a beacon from a wireless node was transmitted, a transmission time of at least one of the beacons, that one of the beacons has (or may have) collided with another beacon or signal, or other beacon status information based on the Beacon Map. In an example embodiment, a beacon may be relocated based on the received Beacon Map. Relocating a beacon may include, for example, determining that a beacon from one of the other wireless nodes has collided or will likely collide with a beacon transmitted from the receiving wireless node, and then relocating the beacon of the receiving node, e.g., to decrease a probability of a beacon collision. Relocating a beacon may include, for example, changing a target beacon transmission time for the beacon.

In another embodiment, an apparatus is provided that includes a controller, a memory coupled to the controller, and a wireless transceiver coupled to the controller. The apparatus may be adapted or configured to: receive a beacon from one or more wireless nodes, to generate a Beacon Map; and to transmit the Beacon Map to one or more wireless nodes, the Beacon Map providing information relating to one or more of the received beacons. In an example embodiment, the apparatus may comprise a mesh point in a wireless meshed network.

In yet another embodiment, a wireless node may be provided that includes: a controller, a memory coupled to the controller, and a wireless transceiver coupled to the controller. The wireless node may be adapted to receive a Beacon Map at a receiving wireless node, to determine based on the Beacon Map that a beacon from the receiving wireless node has collided with or may likely collide with a beacon from another wireless node, and to relocate the beacon of the receiving wireless node. In an example embodiment, the wireless node may comprise a mesh point in a wireless meshed network.

In yet another embodiment, a wireless node may be provided that includes: a controller, a memory coupled to the controller, and a wireless transceiver coupled to the controller. The wireless node, or the controller, may be configured to receive a Beacon Map at a receiving wireless node, the Beacon Map providing information relating to beacons from one or more other wireless nodes. The receiving wireless node may also be configured to determine a status of at least one of the beacons from the one or more other wireless nodes based on the Beacon Map. For example, the receiving wireless node may determine whether or not a beacon from a wireless node was transmitted, a transmission time of at least one of the beacons, that one of the beacons has or may have collided with another beacon or signal, or other beacon status information based on the Beacon Map.

DETAILED DESCRIPTION

Figure 1:
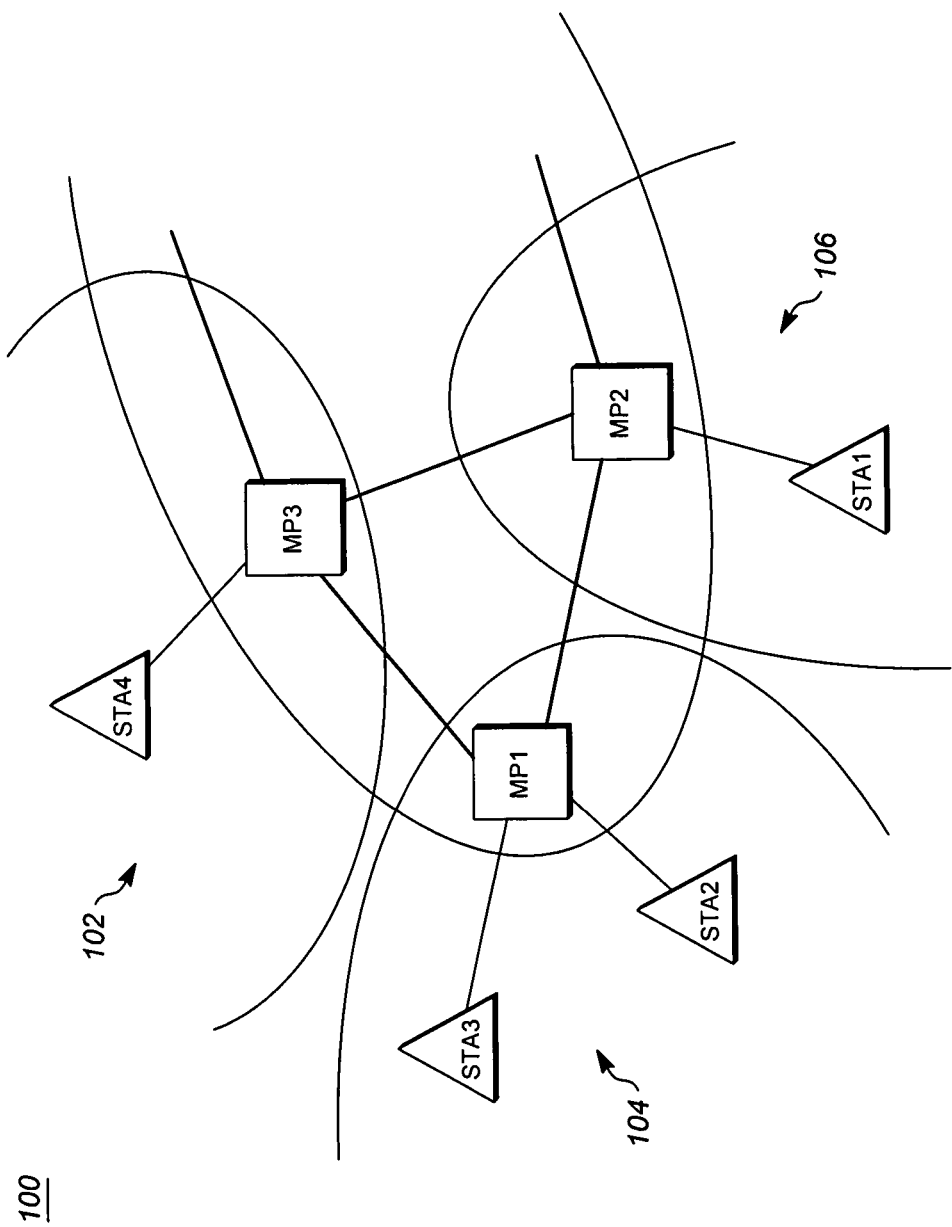
FIG. 1 is a diagram illustrating a wireless meshed network according to an example embodiment.

Referring to the Figures in which like numerals indicate like elements, FIG. 1 is a diagram illustrating a wireless meshed network 100 according to an example embodiment.

According to an example embodiment, a wireless meshed network may be a collection of mesh points (MPs) interconnected with wireless links. Each MP may be an Access Point (AP), a wireless station or other wireless node. For example, a wireless meshed network may employ either a full mesh topology or a partial mesh topology. In a full mesh topology, each node (or mesh point) may be connected directly to each of the other MPs via a wireless link. In a partial mesh topology, the mesh points may be connected to some but not necessarily all of the other mesh points in the meshed network.

In the example wireless meshed network 100 illustrated in FIG. 1, mesh points MP1, MP2 and MP3 may be interconnected via wired or wireless links. Also, each mesh point (MP) may be coupled to one or more wireless stations in its local cell. For example, MP1 is located in cell 104 and is connected via wireless links to stations STA2 and STA3 within cell 104. MP2 is located in cell 106 and is connected via wireless link to stations STA1. MP3 is located in cell 102 and is connected via wireless link to station STA4. Wireless meshed network 100 is merely an example network and the disclosure is not limited thereto.

In an example wireless meshed network, each MP may be capable of many-to-many connections, and may be capable of learning network topology, dynamic path configuration, and other network capabilities, although the disclosure is not limited thereto. Each MP may also be mobile or be capable of being moved or movable, and may be capable of dynamically reconfiguring itself, although the disclosure is not limited thereto.

Each MP may transmit a beacon message, and may receive beacon messages from other MPs. In an example embodiment, a beacon message may be a management or control message transmitted by a mesh point that provides information about the transmitting MP and/or enables other wireless stations or MPs to establish communications with the MP, although the disclosure is not limited thereto. A beacon message may include, for example, information such as the beacon interval (or amount of time between beacon transmissions), a timestamp, a network ID or SSID (service set identifier) identifying a specific WLAN network, an indication of the supported data rates, parameter sets or information about specific signaling methods that are supported, capability information (such as whether Wired Equivalency Privacy or WEP protocol is supported), and other information.

The various embodiments described herein may be applicable to a wide variety of networks and technologies, such as WLAN networks (e.g., IEEE 802.11 type networks), IEEE 802.16 WiMAX networks, WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

The term "wireless node" or "node," or the like, may include, for example, a wireless station, such as a mobile station or subscriber station, an access point (AP) or base station, a relay station, a wireless personal digital assistant (PDA), a cell phone, an 802.11 WLAN phone, a WiMedia device, a WiMAX device, a wireless mesh point (MP), or any other wireless device. These are merely a few examples of the wireless devices and technologies that may be used to implement the various embodiments described herein, and this disclosure is not limited thereto.

Figure 2:
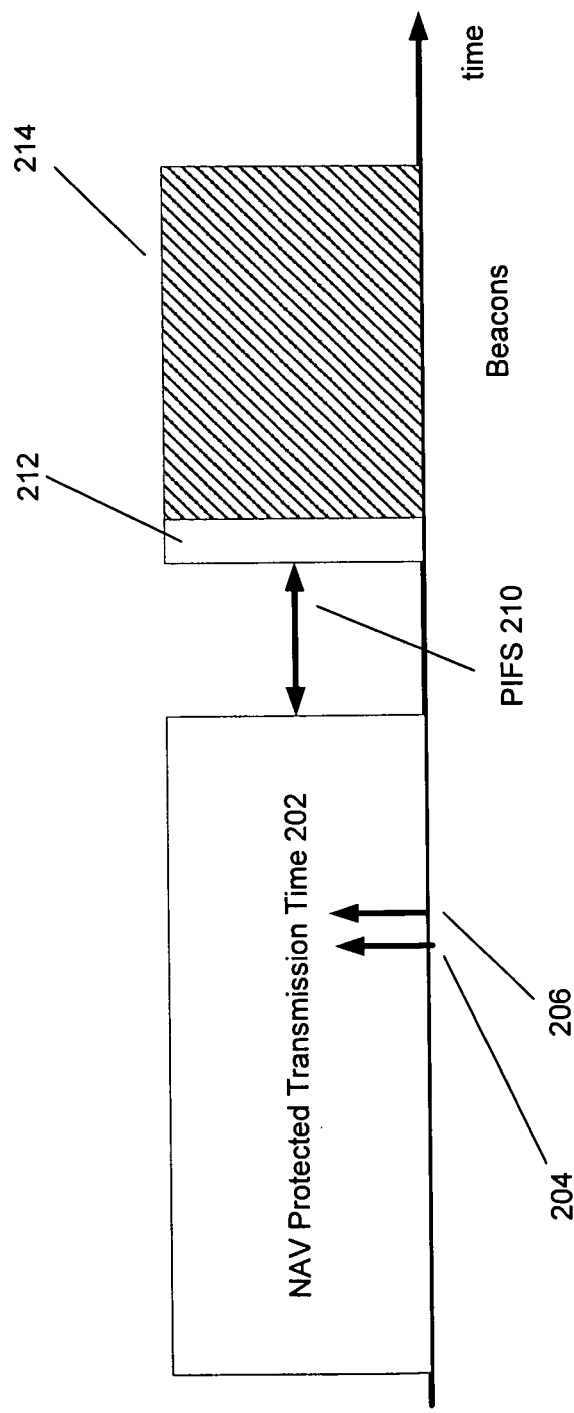
FIG. 2 is a timing diagram illustrating an example collision of beacon messages from two mesh points.

FIG. 2 is a timing diagram illustrating an example collision of beacon messages from two mesh points. As shown in FIG. 2, a beacon message collision can occur if two closely located MPs that operate on the same frequency transmit their beacon messages at or near the same time (e.g., during the same transmit opportunity or TXOP). In this example shown in FIG. 2, MP1 and MP2 are located sufficiently close to each other that their network coverage overlaps. The Target Beacon Transmission Time (TBTT) for MP1 is shown at 204, while the TBTT for MP2 is shown at 206, which is the targeted time for transmitting their beacons if the medium is idle. Since the TBTTs 204 and 206 for MP1 and MP2, respectively, occurs during a NAV (Network Allocation Vector) protected data transmission time 202, both MP1 and MP2 will transmit their beacon messages after a Point Inter-Frame Space (PIFS, 210) time-out after the end of the NAV time 202, for example. In one embodiment the NAV time 202 represents a data transmission occupying the communications channel so that MP1 and MP2 can not send their beacons on TBTT. In this illustrative example, MP1 transmits its beacon message 212 first, followed by the transmission of beacon message 214 by MP2, after the medium has become available. The beacon message 214 from MP2 collides with beacon message 212 causing data corruption. This may occur in wireless systems today because no technique for contention resolution is currently provided for beacon messages.

Therefore, according to an example embodiment, each MP may generate and maintain a Beacon Map and then exchange these Beacon Maps with other MPs. According to an example embodiment, the Beacon Map maintained by a MP may include a list of the beacon messages received by the MP in the last beacon period. This information (Beacon Map) can be shared with other MPs via a Beacon Map Message or other message.

In an example embodiment, a Beacon map may additionally provide the MP with (partial) information about the neighbors of its neighbors (second hop neighbors). The Beacon Map may be used to indicate appropriate (available) and inappropriate (unavailable) beacon transmission times when a new MP joins the meshed network or to indicate when transmission errors occur to beacons (Beacon messages).

Upon initialization, a MP may scan the radio channel and may associate with a MP already in the mesh network. If no mesh network is active the MP can initiate a new one. In the probe, or association message, a MP may request the transmission of the Beacon Map from the receiving MP, or may send a separate Request Beacon Map message to request a Beacon Map. Also other capability parameters may be exchanged, such as beacon period, and max number of nodes within the meshed network, etc.

According to an example embodiment, the Beacon Map may include a list of or one or more beacon messages (beacons) received by the MP in the last beacon period, and information relating to the received beacons. This beacon information provided in a Beacon Map may include, for example, the time instance or time stamp for the beacon, an identification of the MP that sent the beacon, and the (channel) status of the beacon. Several different channel statuses may be specified in the Beacon Map, such as: Idle, Receive, and Collision, although the disclosure is not limited thereto.

Figure 3:
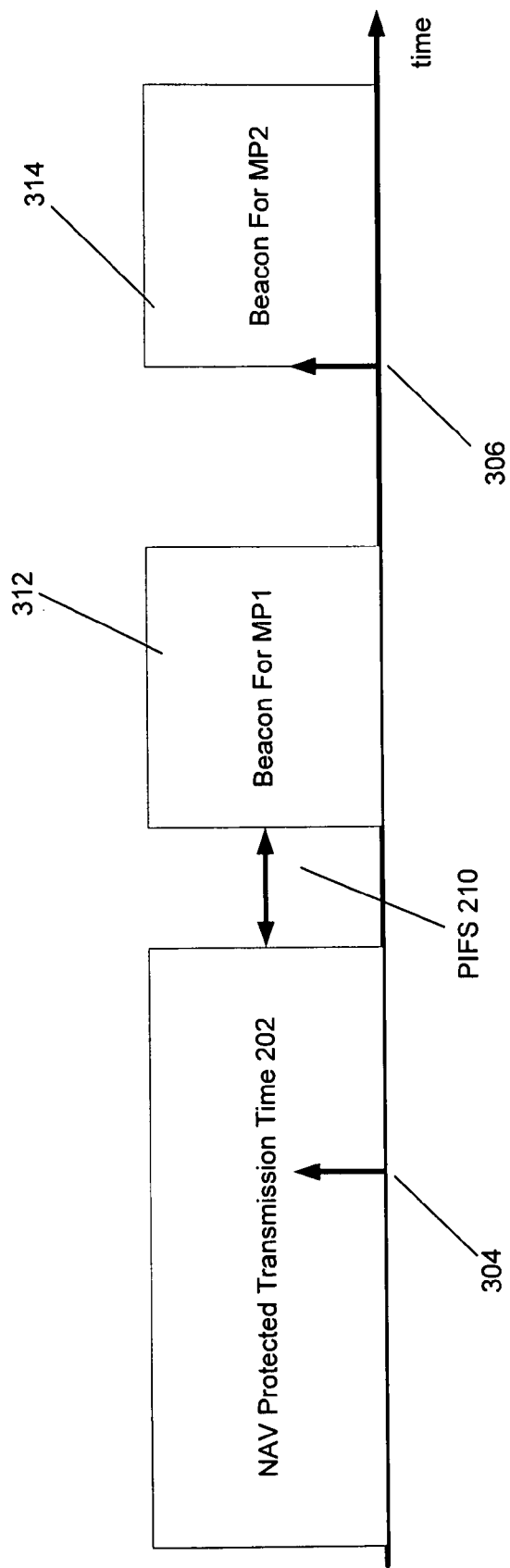
FIG. 3 is a timing diagram illustrating how the transmission of beacon messages from different mesh points may be separated according to an example embodiment.

Table 1 illustrates an example Beacon Map. For each received beacon, the Beacon map may list, for example, a time stamp (or time information) for the received beacon, the MP transmitting the beacon (or associated with the beacon), and the status of the beacon (e.g., receive, idle or collision). In the event that a channel status collision for a beacon, the MP may maintain a count of sequential collisions for that beacon (e.g., indicating detection of collisions for that beacon for the count number of successive beacon periods). The Beacon Map may contain different information and/or additional information. In an example embodiment, the Beacon Map may contain the time stamp information indicating beacon transmission time of the originating MP and the reception times of the beacon messages of the other MPs relative to its own beacon time stamp. The receiving MP can now determine the beacon transmission relative to its own clock. Once the beacon transmission times are known, that information can be used for listening only certain beacons instead of all beacons. This can be used a power saving option. Further the map may contain the MAC address of the originating MP and the status: idle, receive, collision. It may also contain the MAC addresses of the other MPs, and the status of their beacons as well, as shown in FIG. 3.

TABLE 1

| Time stamp [4 bytes] | Time stamp 2 | Time stamp 3 | Time stamp 7 |
|---|---|---|---|
| MP [8 bytes] or MP address | MP2 | MP4 | MP7 |
| Status [2 bits] | Receive | Idle | Collision |
| Amount of sequential collisions [6 bits] | 0 | 0 | 2 |

In normal operation beacon messages are received every beacon period. If the channel status (for the beacon) is idle, in combination with the old MP, this can provide information about mobility. For example, a status of idle may indicate that the MP has been moved or is no longer operating, or has relocated its beacon (as described in greater detail below), etc. Therefore, the Beacon Map indicates that a beacon from the MP has not been received. In such case, the MP that is indicated in the Beacon Map is the last known MP active at that time instant. Also, in an example embodiment, if a channel status of collision is detected for a beacon slot, the MP indicated in the Beacon Map will be the last known MP active at that time instance.

In an embodiment, a Beacon Map may be transmitted (e.g., via a Beacon Map Message) when a MP detects a beacon collision. In an example embodiment, a MP may send the Beacon Map when a collision count for a beacon reaches a predetermined number of collisions (this collision count number may be a design parameter). Alternatively, a MP may send its Beacon Map to another MP upon request, e.g., upon receipt of a Request Beacon Map message. In an embodiment, Beacon Maps are sent only when a beacon collision has been detected or upon request, so as not to add unnecessary additional traffic to the network, although the disclosure is not limited thereto. In an alternative embodiment, a MP may transmit its Beacon Map within its Beacon message (e.g., the Beacon Map may be appended to or provided within the Beacon Message), although this will increase the length of the Beacon message.

A status of collision in combination with the old MP can be used for collision resolution mechanisms between MPs. The Beacon Maps may allow one or more MPs in the wireless meshed network to determine that a beacon collision has occurred. In an example embodiment, at least in some situations, the Beacon Maps may also allow one or more of the MPs to identify which beacons have collided.

For example, one or both MPs involved in a beacon collision may detect the collision, or other MPs in the network may detect the collision. For example, as shown in FIG. 2, a MP may detect a beacon 212 from MP1 for a short period of time before the collision from beacon 214 (MP2) causes data corruption. Therefore, a MP that detected the collision may then generate a Beacon Map indicating MP1, the time stamp (e.g., of the beacon), and a channel status=collision for the beacon for MP1. This Beacon Map may be received by MP2 (the MP that transmitted the colliding beacon 214). MP2 may then compare its own time stamp for its beacon to the time stamps in the Beacon Map for any beacons having a status of "collision." In this case, the close proximity in time of the beacon time stamp for the beacon 214 (MP2) to the time stamp for the collided beacon 212 (MP1) provided in the received Beacon Map may indicate to MP2 that its beacon 214 has collided with the beacon 212 from MP1. This is merely an example of how beacon collision resolution may be accomplished using the Beacon Map. Other techniques may be used as well.

Once a MP has determined that its beacon has collided (or likely collided) with another beacon, the MP may relocate its beacon so as to decrease the probability of a subsequent beacon collision. According to an example embodiment, a MP may relocate or space its beacon a minimum distance from the other colliding beacon by the minimum beacon distance. The minimum beacon distance (time between the beginning of transmission of two beacon messages) may be determined as follows:

$$\text{Min beacon distance} = \frac{t_{beacon}}{N_{MAX}}$$

where $t_{beacon}$ is the duration of the beacon period, and $N_{MAX}$ is the maximum number of nodes that transmit beacon in the same frequency in the system. In an example embodiment, $N_{MAX}$ may be a design parameters and it may be configured when setting up the network or at some other time. It depends on the scenario, in a home environment it can be small, in an office or small campus area it can be larger. According to an example embodiment, $N_{MAX}$ may be set to 32 nodes, but other numbers may be used.

The MP may also determine a maximum TXOP limit such that it fits between the transmission of two beacon messages.

Max TXOP limit=min beacon distance-$t_{Tx\_beacon}$-PIFS-$t_{guard}$

Where, $t_{Tx\_beacon}$ is the transmission time of a beacon message, PIFS is the Point Inter-Frame Space, and $t_{guard}$ is a guard time that is introduced to incorporate synchronization errors.

FIG. 3 is a timing diagram illustrating how the transmission of beacon messages from different mesh points may be separated according to an example embodiment. In this example, based on a Beacon Map that depicted the collision shown in FIG. 2, MP1 has maintained its TBTT 304, and MP2 has relocated its TBTT 306 and beacon 314 some distance or time from the TBTT 304 for MP1, so as to decrease the likelihood of a collision. In an example embodiment, a distance which may be used for relocation may be the minimum beacon distance as explained above. As the TBTT of MP2 is not during NAV protection time, MP2 can send its beacon as scheduled in TBTT. Since TBTT for MP1 is during NAV protected time, MP1 in FIG. 3 has to wait for a PIFS 210 after NAV protection ends, before it can send its beacon 312.

There are several different techniques for determining which colliding MPs should relocate their beacons. Example relocation strategies in case of a collision include, for example:

1) All MPs involved in the collision (having a colliding beacon) will relocate their beacons. This is simple, but can cause subsequent collisions if two or more MPs use the same technique for relocating their beacons or determining a relocation position for their beacon.

2) MP with the lowest MAC address (between the two or more MPs involved in the collision) will relocate. In an example embodiment, a MP (such as one of the colliding MPs) may send a Reschedule Request message to the colliding MP having the lower MAC address, to request this MP to relocate its beacon. Alternatively, the MP having the higher or highest MAC address will relocate.

3) The newer MPs have to relocate, while the older ones can keep their beacon transmission time.

4) the first MP to transmit a beacon that is involved in a collision (such as MP1 in FIG. 2) may keep its beacon transmission time or beacon location; whereas MPs involved in the collision that transmitted their beacons after the first beacon should relocate their beacons (e.g., MP2 in FIG. 2 would relocate its beacon since beacon 214 came after beacon 212). MPs can determine this based on time stamp information in the Beacon Map as compared to its own clock or its own time stamp indicating when it sent its own beacon.

During steady state operation an MP can request other MPs in the meshed network to share their beacon messages that they are currently receiving by means of a special control message that contains a map of beacon messages that that MP currently receives. The map may provide information about the neighbouring nodes of the other MP and may provide an impression of the number of nodes in the meshed network. The Beacon Map may be requested by transmitting a modified probe or association message or a special message Request Beacon Map and may be part of general routing and network status information frame, according to an example embodiment.

In an example embodiment, the MP may be defined to send its Beacon Map to other MPs in case of collision so that they are aware that collisions are occurring and they can change or relocate their beacon transmission times. For this purpose a counter (beacon_collision) may be used by each MP, which keeps track of the number of collisions on one time instance. In an example embodiment, if this counter exceeds a predefined number, the Beacon Map may be transmitted to inform the neighbouring nodes of the beacon collision. The value of the counter may be part of the initial capabilities exchange between MPs or nodes.

According to another example embodiment, if a MP notices that it has transmitted its beacon at a time when beacon_collision counter is greater than or equal to a predetermined value (e.g., 1), it may transmit a frame to inform other terminals. If one MP hears 2 or more MPs that transmit a beacon (and no MP has transmitted "Reschedule Request message") at the same time it will transmit "reschedule Request" message to the MP that has a smaller MAC address (or a larger MAC address, depending on the convention).

One or more, or even all, MPs may apply the same beacon period. In another example embodiment, different MPs may apply different beacon periods, but this information (the beacon period) would then be included in the Beacon Map, making it larger.

Figure 4:
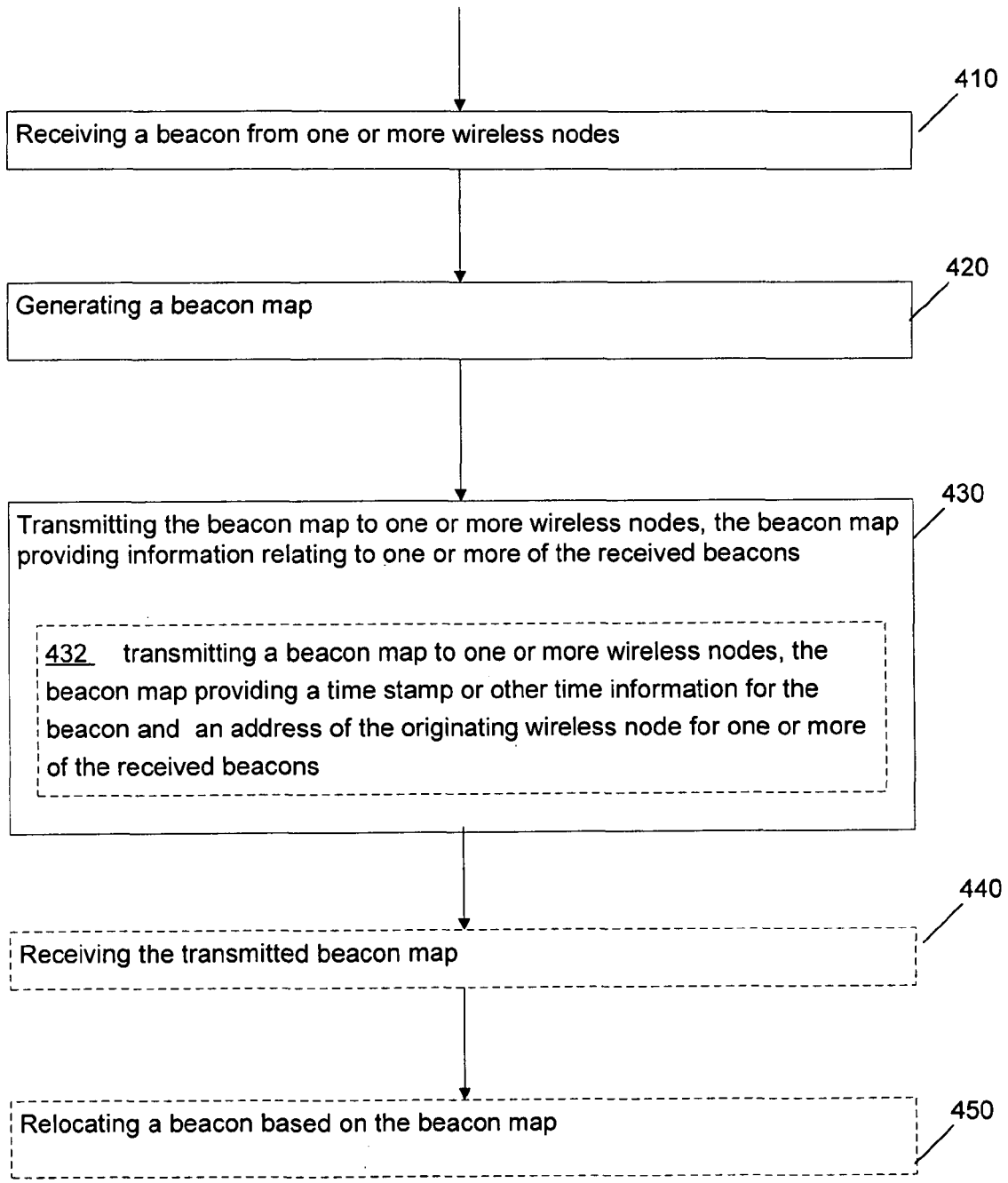
FIG. 4 is a flow chart illustrating operation of a wireless node according to an example embodiment.

FIG. 4 is a flow chart illustrating operation of a wireless node according to an example embodiment. At 410, a beacon is received from one or more wireless nodes. For example, one or more (or even all) MPs or APs in a wireless network may transmit a beacon. At 420, a Beacon Map is generated based on the receive beacons.

At 430, the generated Beacon Map is transmitted to one or more wireless nodes. The Beacon Map may provide information relating to one or more of the received beacons. For example, the Beacon Map may be transmitted as or within a beacon timing information element in a message. Operation 430 may include, for example, transmitting a Beacon Map to one or more wireless nodes, the Beacon Map providing a time stamp or other time information for the beacon and an address of the originating wireless node for one or more received beacons, 432. The address may include, for example, a MAC (media access control) address of the originating node of the beacon.

The transmitting operation 430 may include, for example: receiving a request message, such as a probe request or other request message, and transmitting the Beacon Map in response to receiving the request message. The Beacon Map may be transmitted in a probe response, for example, or other message. In an alternative embodiment, the Beacon Map may be transmitted in a Beacon.

The flow chart of FIG. 4 may also include operations 440 and 450, in an example embodiment. At 440, the transmitted Beacon Map may be received at a receiving wireless node. At 450, a beacon may be relocated based on the Beacon Map. For example, the receiving node may relocate its beacon to a different time based on the Beacon Map, e.g., to decrease a likelihood of collisions with other beacons. For example, the receiving node may change its target beacon transmission time for its beacon. In another example embodiment, the receiving node may send a message to another node to request the other node to relocate its beacon based on the Beacon Map, e.g., to decrease the likelihood of a beacon. collision.

Figure 5:
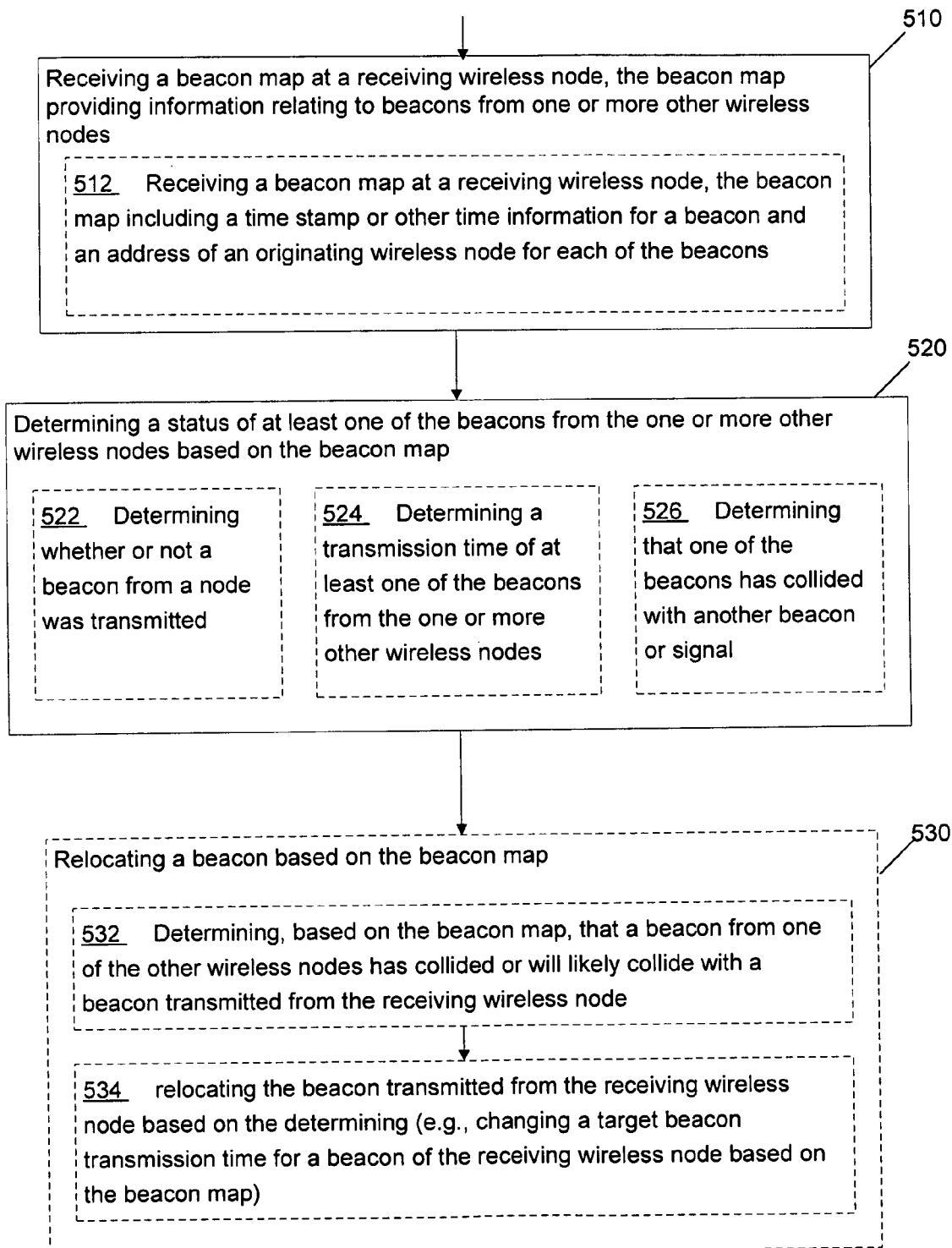
FIG. 5 is a flow chart illustrating operation of a wireless node according to another example embodiment.

FIG. 5 is a flow chart illustrating operation of a wireless node according to another example embodiment. At 510, a Beacon Map is received at a receiving wireless node. The Beacon Map may provide information relating to beacons from one or more other wireless nodes. The Beacon Map may be provided as or within a beacon timing information element, for example. Operation 510 may include receiving a Beacon Map at a receiving wireless node, the Beacon Map including a time stamp or other time information for a beacon and an address of an originating wireless node for each of the beacons, 512.

At 520, a status may be determined of at least one of the beacons from the one or more other wireless nodes based on the Beacon Map. Operation 520 may include one or more other operations, such as operations 522, 524 and/or 526. Different types of Beacon status may be determined, for example, based on the Beacon Map.

At operation 522, it may be determined whether or not a beacon from a node was transmitted, or is transmitting. For example, if a Beacon Map lists an address of a node and a time stamp or time offset for the beacon (e.g., indicating a beacon transmission time), this may indicate that the beacon for such node is transmitting.

At operation 524, a beacon transmission time may be determined of at least one of the beacons from one or more other wireless nodes based on the Beacon Map. For example, the receiving node may determine a beacon transmission time based on a time stamp or time offset provided in the Beacon Map for the beacon, for example.

At operation 526, it may be determined that one of the beacons has collided with another beacon or signal. For example, by comparing time stamps for beacons in the Beacon Map, it may be determined, based on overlap or closeness in time values or time stamp values, that two beacons may have collided. A receiving station may also determine that its own beacon has collided or will likely collide with a beacon based on time information for other beacons provided in the Beacon Map, for example.

At operation 530, a beacon may be relocated based on the Beacon Map. A beacon may be relocated, for example, by changing a targeted beacon transmission time. In an example embodiment, the receiving node may relocate its beacon, e.g., to decrease a likelihood of collision with other beacons.

In an example embodiment, operation 530 may include operations 532 and/or 534. At operation 532, it may be determined, based on the Beacon Map, that a beacon from one of the other wireless nodes has collided or will likely collide with a beacon transmitted from the receiving wireless node. At operation 534, the beacon transmitted from the receiving wireless node may be relocated based on the determining (operation 532), e.g., by changing a targeted beacon transmission time.

Figure 6:
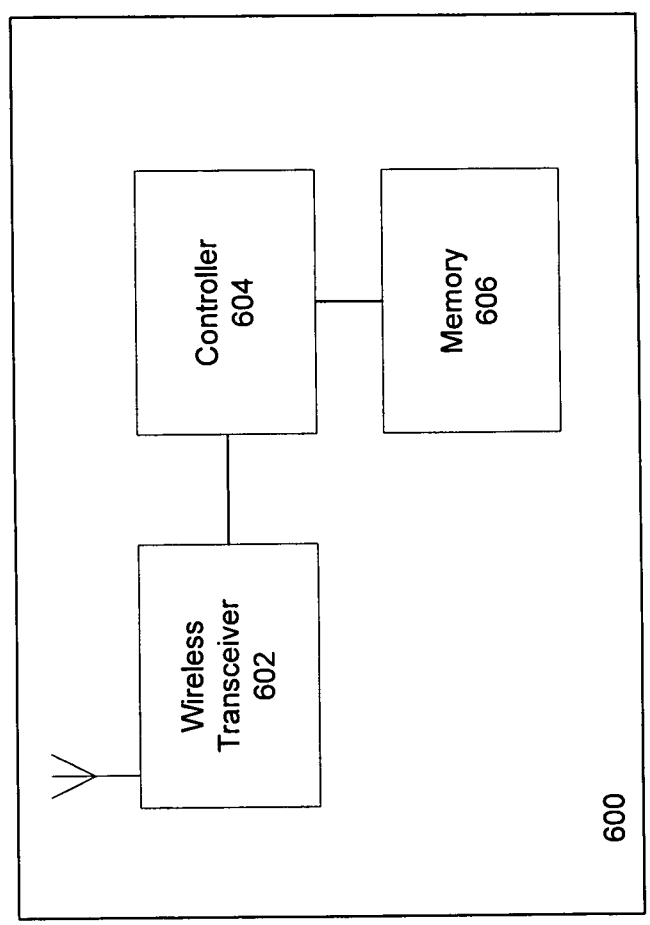
FIG. 6 is a block diagram illustrating an apparatus that may be provided in a wireless node according to an example embodiment.

In an example embodiment, each wireless node or mesh point (MP) may include a wireless transceiver, a processor or controller, and memory. FIG. 6 is a block diagram illustrating an apparatus 600 that may be provided in a wireless node according to an example embodiment. The wireless node, such as a station, AP, MP, etc., may include, for example, a wireless transceiver 602 to transmit and receive signals, a controller 604 to control operation of the station or node and execute instructions or software, and a memory 606 to store data and/or instructions.

Controller 604 may be programmable and capable of executing software or other instructions stored in memory or on other computer media to perform the various tasks and functions described above, such as one or more the tasks or methods described above in FIGS. 1-5. For example, the apparatus 600 may, through operation of controller 604 and other devices in apparatus 600, may receive a beacon from one or more wireless nodes, generate a Beacon Map, and transmit the Beacon Map to one or more wireless nodes. In another example embodiment, the apparatus 600 may, through operation of controller 604, etc., receive a Beacon Map at a receiving wireless node, the Beacon Map providing information relating to beacons from one or more other wireless nodes, and determine a status of at least one of the beacons from the one or more wireless nodes from the Beacon Map.

In addition, a storage medium may be provided that includes stored instructions, when executed by a controller or processor (such as a mesh point processor) will result in the MP or MP processor performing one or more of the functions or tasks described above. For example, a storage medium may be provided that includes stored instructions, when executed by controller 604, may result in the wireless node or controller 604 performing one or more of the functions or tasks described above and with reference to FIGS. 1-5.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) or methods described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the example embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving a beacon map at a receiving wireless node either periodically or in response to sending a request message requesting the beacon map, the beacon map comprising information on beacon transmission times of one or more other wireless nodes;
determining, with a processor, a status of at least one of the beacons from the one or more other wireless nodes based on the beacon map; and
relocating a beacon to be transmitted by the receiving wireless node based on the beacon map, wherein the relocating comprises:
determining, based on the beacon map, that one of the beacons from one of the other wireless nodes has collided or will likely collide with a beacon transmitted from the receiving wireless node; and
relocating the beacon to be transmitted from the receiving wireless node based on the determining.

2. The method of claim 1 wherein the determining the status comprises determining a transmission time of at least one of the beacons from the one or more other wireless nodes.

3. The method of claim 1 wherein the receiving the beacon map comprises:
receiving the beacon map at the receiving wireless node, the beacon map including a time stamp and an address of an originating wireless node for each of the beacons.

4. The method of claim 1 wherein the relocating comprises changing a target beacon transmission time for the beacon based on the beacon map.

5. An apparatus comprising at least one processor and at least one memory including computer program code, the at least one memory and the computer program configured to, with the processor, cause the apparatus to at least:
receive a beacon map at a receiving wireless node either periodically or in response to sending a request message requesting the beacon map, the beacon map comprising information on beacon transmission times of beacons from one or more other wireless nodes;

determine a status of at least one of the beacons from the one or more other wireless nodes based on the beacon map; and relocating a beacon to be transmitted by the receiving wireless node based on the beacon map, wherein the relocating comprises:

determining, based on the beacon map, that one of the beacons from one of the other wireless nodes has collided or will likely collide with a beacon transmitted from the receiving wireless node; and relocating the beacon to be transmitted from the receiving wireless node based on the determining.

6. The apparatus of claim 5 wherein the apparatus comprises a mesh point in a wireless meshed network.

7. The method of claim 5 wherein the determining the status comprises determining a transmission time of at least one of the beacons from the one or more other wireless nodes.

8. The method of claim 5 wherein the receiving the beacon map comprises:

receiving the beacon map at the receiving wireless node, the beacon map including a time stamp and an address of an originating wireless node for each of the beacons.

9. The method of claim 5 wherein the relocating comprises changing a target beacon transmission time for the beacon based on the beacon map.

* * * * *